US009158325B1

(12) United States Patent
Lim (10) Patent No.: US 9,158,325 B1
(45) Date of Patent: Oct. 13, 2015

(54) CABLE QUALITY DETECTION AND POWER CONSUMER DEVICES

(71) Applicant: Infineon Technologies AG, Neubiberg (DE)

(72) Inventor: Cheow Guan Lim, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/258,953

(22) Filed: Apr. 22, 2014

(51) Int. Cl.
*G05F 1/10* (2006.01)
*G05F 5/00* (2006.01)
*G01K 7/00* (2006.01)
*H02J 7/00* (2006.01)

(52) U.S. Cl.
CPC .. *G05F 5/00* (2013.01); *G01K 7/00* (2013.01); *H02J 7/0052* (2013.01)

(58) Field of Classification Search
CPC .......... H02H 3/025; H02H 3/24; H02H 3/445
See application file for complete search history.

(56) References Cited

U.S. PATENT DOCUMENTS

| 8,498,087 | B2* | 7/2013 | Rabu et al. | 361/104 |
| 2014/0245030 | A1* | 8/2014 | Helfrich et al. | 713/300 |
| 2014/0312691 | A1* | 10/2014 | Doljack et al. | 307/29 |
| 2015/0028824 | A1* | 1/2015 | Tse et al. | 323/234 |
| 2015/0048804 | A1* | 2/2015 | Toivanen et al. | 320/162 |
| 2015/0082056 | A1* | 3/2015 | Hsieh et al. | 713/300 |

OTHER PUBLICATIONS

Kester, W., et al., "Battery Chargers," Analog Devices, www.analog.com/static/imported-files/tutorials/ptmsec5.pdf, 25 pages.
Koser, J. R., et al., "Universal Serial Bus Cables and Connectors Class Document," Revision 2.0, Aug. 2007, 48 pages.
Lai, M., et al., "Battery Charging Specification," Revision 1.2, Dec. 7, 2010, 71 pages.
Montag, B., et al., "Universal Serial Bus Power Delivery Specification," Revision 1.0, Including Errata (Version 1.0), Jun. 26, 2013, pp. 1-328.
Shea, J. J., "Identifying Causes for Certain Types of Electrically Initiated Fires in Residential Circuits," Fire and Materials, vol. 35, Issue 1, Jan./Feb. 2011, pp. 19-42.
Wikipedia, "USB," http://enwikipedia.org/wiki/US#cite_note-63, Mar. 21, 2014, pp. 1-39.
"USB Power Delivery Specification 1.0," USB Power Delivery—1.0 Introduction, Jul. 16, 2012, pp. 1-11.

* cited by examiner

*Primary Examiner* — Jeffrey Zweizig
(74) *Attorney, Agent, or Firm* — Slater & Matsil, L.L.P.

(57) ABSTRACT

In one embodiment, a method includes receiving power at a power consumer device coupled to a power provider device by a cable. The received power is supplied at a first current at an input of the power consumer device and is supplied to a load in the power consumer device. The method includes measuring a rate of change of the voltage at the input of the power consumer device, and determining whether the rate of change of the voltage at the input of the power consumer device is less than a first target rate of change of voltage. The current received at the input of the power consumer device is reduced to a second current lower than the first current if the rate of change of the voltage at the input of the power consumer device is greater than the first target rate of change of voltage.

20 Claims, 6 Drawing Sheets

CABLE QUALITY DETECTION AND POWER CONSUMER DEVICES

TECHNICAL FIELD

The present invention relates generally to cable quality detection, and, in particular embodiments, to a system and method for cable quality detection and power consumer devices.

BACKGROUND

Universal Serial Bus (USB) is an industry standard developed that defines the cables, connectors and communications protocols used in a bus for connection, communication, and power supply between electronic devices.

In many portable products, USB is often used both as a communication port and as a power delivery port to accommodate battery charging. For example, a standard USB 2.0 compliant port may provide a maximum power delivery of 7.5 W (5V at 1.5 A) to a dedicated charging port that may be used to recharge the battery of a portable device. However, as the battery capacities of portable devices are increasing, for example, from 5600 mAh to 8000 mAh and 10000 mAh, the charging time for these devices increases accordingly. For example, using a standard USB 2.0 compliant port, it takes about 2 hours and 40 minutes to recharge a 5600 mAh battery, but it takes 4 hours and 45 minutes to recharge a 10000 mAh.

Faster charging times may be achieved by increasing the charging current and/or charging voltage. USB Power Delivery (PD) specification specifies using certified PD aware USB cables with standard USB type A/B connectors to deliver up to 100 W of power at 20 V. USB PD requires the use of PD-aware cables. For example, PD-aware cables with USB-micro B/AB connectors may support a maximum power of up to 60 W at 20V, 36 W at 12 V and 10 W at 5 V. Consequently, under new USB standards, currents up to 5 A and power up to 100 W may be transferred through power delivery aware cables.

USB specification requires specification on the electrical parameters for the USB cables. For example, USB specification requires that USB cables have an American Wire Gauge (AWG) rating of 24-26, and further require that micro-B connectors have less than 50 mΩs.

However, USB cables including PD-aware cables may not be able to safely handle the large currents. For example, the cables may become defective during use due to field stress. Additionally, some of the USB manufacturers may not have good quality control. The large power supplied through a defective USB can pose a significant safety risk. Similarly, due to backward compatibility, end users may not be aware of the necessity to use the newer PD-aware cables.

SUMMARY OF THE INVENTION

In accordance with an embodiment of the present invention, a method for powering a device comprises receiving power at a power consumer device coupled to a power provider device by a cable. The received power is supplied at a first current at an input of the power consumer device. The method further includes supplying the received power to a load in the power consumer device and measuring a rate of change of the voltage at the input of the power consumer device. It is determined whether the rate of change of the voltage at the input of the power consumer device is less than a first target rate of change of voltage. The current received at the input of the power consumer device is reduced to a second current lower than the first current if the rate of change of the voltage at the input of the power consumer device is greater than the first target rate of change of voltage.

In accordance with an alternative embodiment of the present invention, a method for detecting temperature of a power cable comprises measuring a voltage at an output of the power cable during power delivery by the power cable, and computing a rate of change of voltage at the output of the power cable during the power delivery. An indicator of a temperature of the power cable is computed from the rate of change of voltage.

In accordance with an alternative embodiment of the present invention, a power consumer device comprises an input configured to receive power and configured to be coupled to a power provider device by a power delivery cable, the received power having a first current at an input pin of the power consumer device. An adjustable power supply is configured to supply the received power to a load in the power consumer device. A control circuit is configured to compute a rate of change of the voltage of the received power at the input of the power consumer device. The control circuit is further configured to determine whether the rate of change of the voltage at the input of the power consumer device is less than a first target rate of change of voltage. The control circuit is further configured to reduce received power at the input of the power consumer device to a second current lower than the first current if the rate of change of the voltage at the input of the power consumer device is greater than the first target rate of change of voltage.

BRIEF DESCRIPTION OF THE DRAWINGS

For a more complete understanding of the present invention, and the advantages thereof, reference is now made to the following descriptions taken in conjunction with the accompanying drawings, in which:

FIG. 6, which includes

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for mitigating risk of arcing in USB cables during power delivery. The invention may also be applied to other applications including other cables that perform communication and/or provide power to electronic devices.

When a cable that is under-rated is used for an application that draws a higher current, the cable insulator deteriorates due to heating over a period of time. A wire or cable subjected to stress heats up due to the passage of electric current because of the intrinsic resistance of the wire. However, if the wire includes a defect, e.g., a defect that results in current crowding or a local increase in current in a small area, that area selectively heats up more. Generally, a wire is designed to be capable of working up to a maximum current. However, the rating of the wire may not take into effect any field damage to the wires. For example, due to user misuse, a defect may be formed on a current carrying wire.

Thus, although the wire may be initially compliant, the wire may become unsuitable for use subsequently. Further, due to the large variation in number of manufacturers, there may be variation in quality, length, diameter of the wires. Further, some manufacturers may not have sufficient quality control and therefore the wires may not be compliant with USB requirements, for example, which require wires to be AWG 24-26, with a maximum length of 2 m and with a maximum voltage drop of 50 mΩs.

Figure 1:
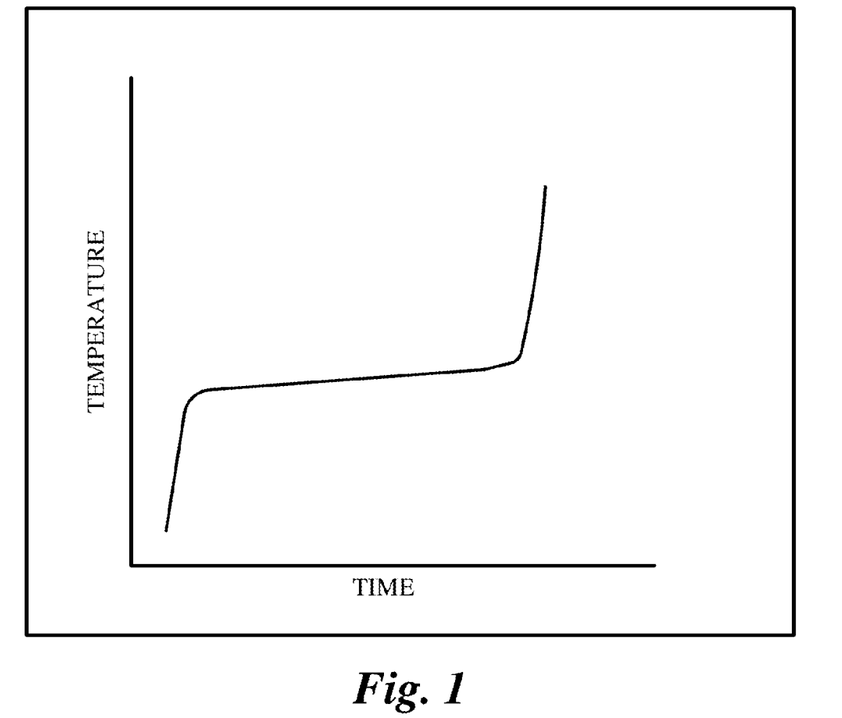
FIG. 1 illustrates the temperature characteristics of a wire under stress.

FIG. 1 illustrates the temperature characteristics of a wire under stress.

Referring to FIG. 1, when a high amount of current is passed through a wire such as an USB cable, the temperature of the wire increases initially until a quasi-thermal equilibrium is reached. After that initial stage, the temperature slowly increases over a long period of use until failure. However, the failure at this stage may be catastrophic as the wire and/or surrounding insulation burns. Because of the backward compatibility of USB cables, there is a real danger of end customers using inappropriate and/or defective USB cables for power delivery where large amount of currents are drawn through the USB cable.

Figure 2:
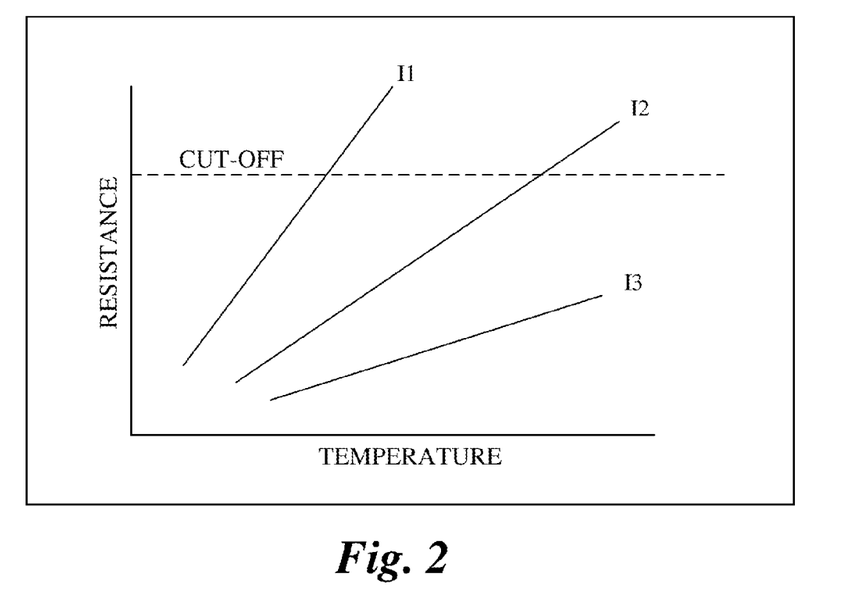
FIG. 2 illustrates increase in wire resistance with an increase in temperature for wires of different initial wire resistance.

FIG. 2 illustrates a graph showing how wire resistance increases with respect to temperature for wires of different initial wire resistance. In FIG. 2, the three curves 11, 12, 13 illustrate an example of a wire subjected to heating. The curves 11, 12, 13 illustrate the behavior of wires with different initial resistance. As the temperature of the wire increases, the resistance of the wire increases. The increase in resistance for a wire with larger initial resistance may be much more than a wire with a lower initial resistance. Therefore, some of the wires with a larger initial resistance may become non-compliant because the resistance increases to over a maximum allowable resistance (denoted as CUT-OFF resistance). For example, compliant USB cables are expected to have a resistance less than 50 mΩs. However, during use the USB cable may become non-compliant due to heating and pose a significant danger to the end customer.

Embodiments of present invention prevent damage to cables and avoid the safety issues of using defective cables by monitoring the temperature of the cable and stopping or lowering the power delivered through the cables. Embodiments of the invention monitor the temperature change of the wire without directly measuring the temperature with a temperature sensor thereby avoiding such catastrophic failure.

An embodiment of the present invention will be described using FIGS. 3 and 4. A system comprising a power provider device and power consumer device implementing embodiments of the present invention will be described using FIG. 5. A power consumer device in accordance with embodiments of the present invention will be described using FIG. 6. A method implementing embodiments of the present invention will be described using FIG. 7.

Figure 3:
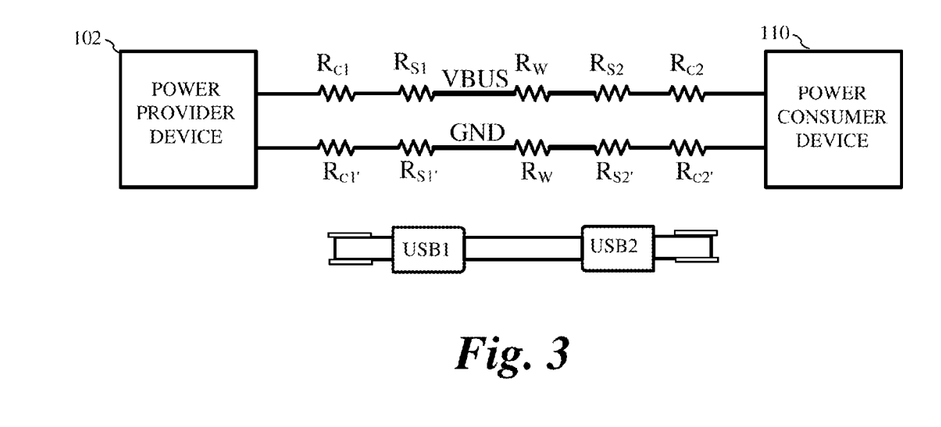
FIG. 3 illustrates a schematic of an equivalent resistance between a power provider device and a power consumer device using a power delivery cable.

FIG. 3 illustrates a schematic of an equivalent resistance between a power provider device and a power consumer device using a power delivery cable.

The resistance through a power delivery cable between the power provider device 102 and the power consumer device 110 may be divided in to a number of smaller resistances. For example, a first contact resistance Rc1 is the resistance where the power delivery cable contacts the output pins of the power provider device 102. Similarly, the channel resistance includes a first socket resistance Rs1, for example, of the first USB dongle (USB1), a wire resistance Rw of the cable, a second socket resistance Rs2 of the second USB dongle (USB2), a second contact resistance Rc2 where the cable contacts the input pins of the power consumer device 110.

Figure 4:
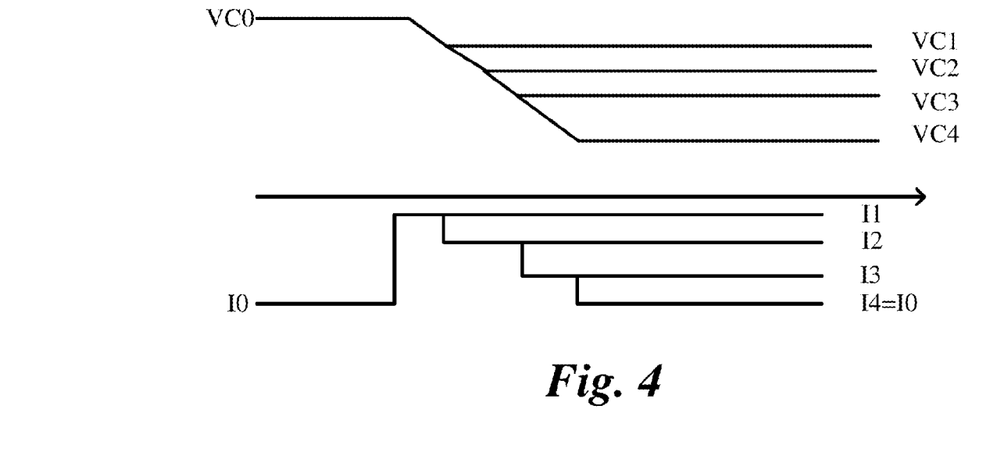
FIG. 4 illustrates the relationship between current drawn and the voltage at the power consumer device.

FIG. 4 illustrates the relationship between current drawn and the voltage at the power consumer device.

Initially, the voltage at the power consumer device input pin (V0) is at the output voltage of the power provider before any load of the power consumer device is applied. As the load is not connected yet, the current through the cable is negligible (I0).

After power is supplied to a load (e.g., the battery of the power consumer device begins to charge), a constant current flow is established through the cable, which heats up the cable. The increase in temperature of the cable increases the resistance of the cable, which increases the voltage drop through the cable. In other words, the voltage at the power consumer device drops due to the increase in resistance of the cable due to heating.

In various embodiments of the present invention, the voltage at the power consumer device 110 (FIG. 3) is monitored, first with no load current, and then during the constant current drawn for charging. The change in voltage is constantly monitored so as to establish an indication of heating up of the wire or USB cable providing the power supply to the power consumer device.

The following analysis provides a more detailed description of the current-voltage relationships illustrated in FIG. 4 along with the resistances illustrated in FIG. 3.

Referring to FIG. 3, the total resistance of the power delivery cable can be computed by adding each of the individual resistances. Accordingly, for the voltage bus VBUS, the resistance RVBUS can be computed according to Equation (1).

$$RVBUS = Rc1 + Rs1 + Rw + Rs2 + Rc2 \qquad (1).$$

Similarly, the resistance of the ground wire RGND can be calculated as follows according to Equation (2).

$$RGND = Rc1' + Rs1' + Rw' + Rs2' + Rc2' \qquad (2).$$

Therefore, the total resistances of the power delivery cable at the start of the current draw may be represented with RVBUS, 0 and RGND, 0. Similarly, the total resistances of the power delivery cable at a time "n" during the constant current draw may be represented with RVBUS, n and RGND, n. The voltage measured at the power consumer device at no load or no current (negligible current) is represented as VCharger (0A). The voltage measured at the power consumer device during charging with a constant current at the start of charging is represented with VCharger(0). The voltage measured at power consumer device during charging with a constant current at time n is represented with VCharger(n).

The potential drop immediately upon application of the load can be estimated as V0, which may be computed using Equation (3).

$$V0 = VCharger(0A) - VCharger(0) = Vr + Icc \times (RVBUS, 0 + RGND, 0), \qquad (3)$$

where Icc is the constant current and Vr is the voltage drop in the absence of the wire resistance.

After some time, the cable heats up changing the cable resistance. Accordingly, the potential drop Vn may be computed as given by Equation (4).

$$Vn = V\text{Charger}(0,4) - V\text{Charger}(n) = Vr + Icc \times (RVBUS, n + RGND, n) \quad (4)$$

In an alternative embodiment, the potential drop immediately upon application of the load may be estimated as a difference between two intermediate times, and therefore may be computed using Equation (5).

$$V0 = V\text{Charger}(n2) - V\text{Charger}(n1) = Vr + (Iccn(n2) - Icc(n1)) \times (RVBUS, 0 + RGND, 0), \quad (5)$$

where Icc(n1) is the constant current at time n1, Icc(n2) is the constant current at time n2, and Vr is the voltage drop in the absence of the wire resistance.

The rate of change of voltage (dV/dt) can be computed as follows according to Equation 6.

$$dV/dt = \frac{(Vn - V0)}{n} = Icc \times ((RVBUS, n + RGND, n) - (RVBUS, 0 + RGND, 0))/n. \quad (6)$$

Therefore, the rate of change of voltage (dV/dt) is directly proportional to the rate of change of resistance (dR/dt) as provided by Equation (7).

$$\frac{dV}{dt} = Icc \times \frac{dR}{dt}. \quad (7)$$

However, the resistance of a material may be represented as being linearly related to the temperature change. The rate of change of resistance (dR/dt) is proportional to the rate of change of temperature (dT/dt). Therefore, rate of change of voltage (dV/dt) at constant current is directly proportional to the difference in temperature at time n (Tn) and the initial temperature without heating (T0). Therefore, the rate of change of voltage is provided as follows by Equation (8).

$$\frac{dV}{dt} = \text{Constant} \times \frac{dT}{dt} = \text{Constant} \times \frac{Tn - T0}{n}. \quad (8)$$

Accordingly, in various embodiments, the change in rate of voltage may be used to detect heating of the power supply cable.

FIG. 4 illustrates examples of different voltage drops associated with different amounts of heating of a power delivery cable under use. Prior to the coupling of the load (condition with no load current, which is represented as I0), the voltage at the charger may be VC0. At the beginning, the cable may be at a first temperature T1 (e.g., room temperature) and accordingly has a corresponding resistance. This results in a drop in the measured voltage to VC1. Thus, the initial potential drop may be represented as VC0–VC1.

During use, the cable heats up, for example, to a second temperature T2 increasing the resistance of the cable. Thus, at the second temperature T2, the measured voltage drops further to VC2. As the cable heats further to a third temperature T3, the measured voltage drops further to VC3, and similarly at a fourth temperature T4, the measured voltage may drop further to VC4. For example, at the fourth temperature, the voltage at the charger may significantly drop below a threshold voltage. Further, calculating the difference between the voltages, for example, VC4–VC1 or VC4–VC0 provides a measure of the voltage drop due to heating. For example, if the difference in VC4–VC0 exceeds 50 mV, the cable is non-compliant with USB standards, which allow only a 50 mV maximum voltage drop across the power supply cable. As will be described further using FIGS. 5-7, in one or more embodiments, a power control circuit may shut off the current supply as indicated by the current I4.

In another embodiment, the current supply may be progressively changed with the increase in resistance of the cable. For example, when the voltage drops to the second voltage VC2, the constant current for charging the batteries may be reduced to the second constant current I2. Similarly, when the voltage drops to the third voltage VC3, the constant current for charging the batteries may be reduced to the third constant current I3.

In one or more embodiments, the load or charging current may be reduced to compensate for the reduction in voltage. Further, if the voltage falls below a threshold voltage, the load current may be cut-off or stopped. By reducing the charging current, the applied voltage may be increased back to normal charging voltage. This is because the charging voltage is a critical parameter and has to be controlled tightly especially for lithium ion batteries.

Figure 5:
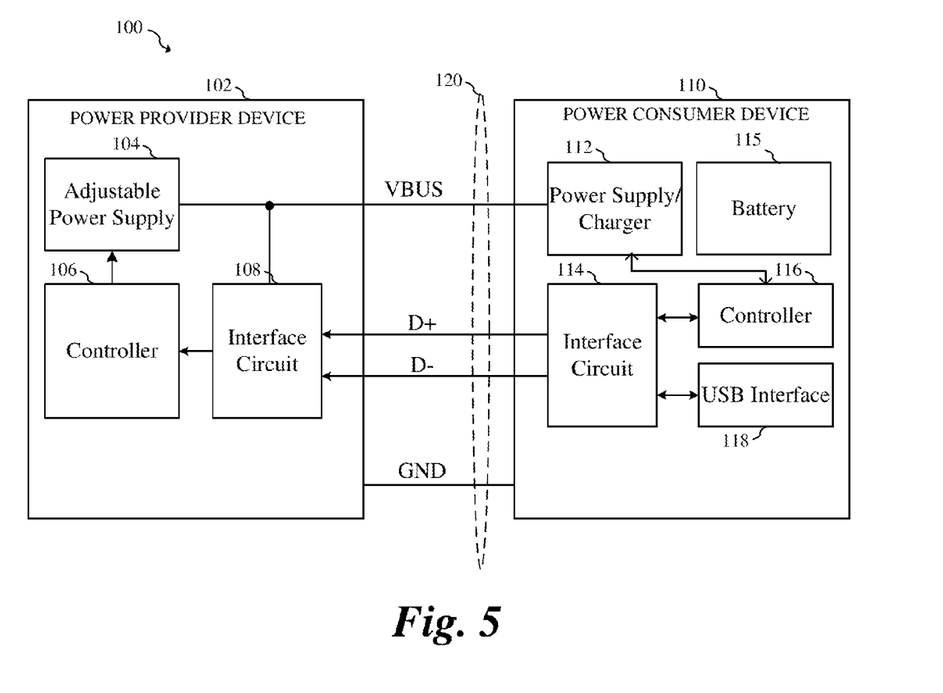
FIG. 5 illustrates a power system according to an embodiment of the present invention.

FIG. 5 illustrates a power system 100 according to an embodiment of the present invention. The power system 100 includes a power provider device 102 that is coupled to a power consumer device 110 via a power delivery cable 120. The power delivery cable 120 may adhere to various standard protocols. In one embodiment, the power delivery cable 120 is a universal serial bus (USB) cable. In alternative embodiments, the power delivery cable 120 may comprise a cable compliant with other standards such as Lightning™, IEEE 1394 (FireWire), IEEE 802.3af Power over Ethernet, and others.

In various embodiments, the power consumer device 110 may represent any device that is coupled to the power provider device 102 via a cable such as a USB cable. As shown, the power delivery cable 120 may include signal lines including power supply connection VBUS, the ground connection GND, and data lines D+ and D−. In alternative embodiments, other power and data connections may be used instead of power delivery cable 120, for example, separate cables for power and data lines.

The power provider device 102 includes an adjustable power supply 104 that provides power to the power supply connection VBUS of the power delivery cable. In various embodiments, the adjustable power supply 104 may comprise a switched mode power supply (SMPS). In one or more embodiments, the adjustable power supply 104 comprises a transformer-isolated converter such as a flyback converter. In alternative embodiments, the adjustable power supply 104 may comprise other insulated or non-insulated topologies.

In embodiments of the present invention, the amount of power provided to the power consumer device 110 may be adjusted by changing the output voltage of the adjustable power supply 104. For example, the voltage of the power supply connection VBUS may be adjusted between about 5 V and about 20 V in various numbers of steps. Alternatively, voltages outside of this range may be used depending on the particular device and its specifications. For example, the USB cable may allow up to 100 W of power consumption, which may be provided, for example, at 5 V or at 20 V.

The power provider device 102 also includes an interface circuit 108 coupled to data lines D+ and D−. In an embodiment, the interface circuit 108 includes a transmitter and receiver configured to engage in communication between the power provider device 102 and the power consumer device 110. In one embodiment, this communication between the power provider device 102 and power consumer device 110 is one-sided, i.e., from the power consumer device 110 to the power provider device 102. However, in alternative embodiments, the communication may also be two-sided, for example, duplex or half-duplex. The controller 106 receives the communication from the interface circuit 108 and controls the adjustable power supply 104. In particular, the controller 106 is configured to regulate the output voltage. This results in a change in the output voltage at the power supply connection VBUS of the power delivery cable.

In various embodiments, the power consumer device 110 consumes power delivered by the power provider device 102. The power consumer device 110 includes a power supply/charger 112 that receives power from the adjustable power supply 104 within the power provider device 102.

Depending on the particular implementation of the power consumer device 110, the power supply/charger 112 may operate at various voltages of the power supply connection VBUS. For example, during a normal operation mode, the power supply/charger 112 may provide sufficient power to the power consumer device 110 when the power supply connection VBUS is set to about 5 V. On the other hand, during a charging operation, or during a fast charging operation, the power supply/charger 112 may be able to more quickly charge a battery/sink 115 coupled to the power consumer device 110 when the power supply connection VBUS is set to a higher voltage, such as 12 V or 20 V.

As illustrated in FIG. 5, the power delivery cable 120 connects the power provider device 102 to the power consumer device 110. In USB power delivery, pairs of directly attached ports negotiate voltage, current and/or direction of power flow over the power supply conductor VBUS. In particular, using the data lines D+ and D−, the power consumer device 110 may request, from the power provider device 102, a particular current or voltage at the power supply connection VBUS. In response, the power provider device 102 may provide the requested current or voltage to the power consumer device 110 through the power supply connection VBUS of the power delivery cable 120.

In an embodiment, the power consumer device 110 may signal the power provider device 102 for a requested power supply voltage at the power supply connection VBUS. This signaling, for example, may occur via the interface circuit 114 that includes a transmitter and a receiver capable of communication with the power provider device 102, and provides a way for the power consumer device 110 to indicate to the power provider device 102 that the power consumer device 110 is able to operate at a higher voltage than the standard 5 V USB power voltage.

In another embodiment as will be described in more detail below, the power consumer device 110 may signal the power provider device 102 with a request to lower the power supplied at the power supply connection VBUS of the power delivery cable to reduce the heating of the cable.

The controller 116 may operate the interface circuit 114 and the USB interface 118 and coupled to data pins D+ and D− via the interface circuit 114. In one or more embodiments, communication between the power provider device 102 and the power consumer device 110 is performed using high speed circuitry of a standard USB interface. Alternatively, in some embodiments, the communication between the power provider device 102 and the power consumer device 110 may be performed separately or using standard circuitry of the appropriate standard of the power consumer device 110.

In various embodiments of the present invention, to avoid over heating of the power delivery cable, the power consumer device 110 may also self-adjust the amount of power provided to the battery/sink 115 by changing the output voltage and/or output current from the power supply/charger 112. The reduction in power provided to the battery/sink 115 results in a corresponding reduction in power drawn through the power delivery cable.

In various implementations, the power provider device 102 and the power consumer device 110 may be implemented in many different ways. The power provider device 102 and the power consumer device 110 may have many different configurations, e.g., USB or non-USB communication, single versus multiple ports, dedicated power supplies versus supplies shared on multiple ports, hardware versus software based implementations, for example. The architecture in FIG. 5 is provided to illustrate the high level components in one possible implementation.

Figure 6A:
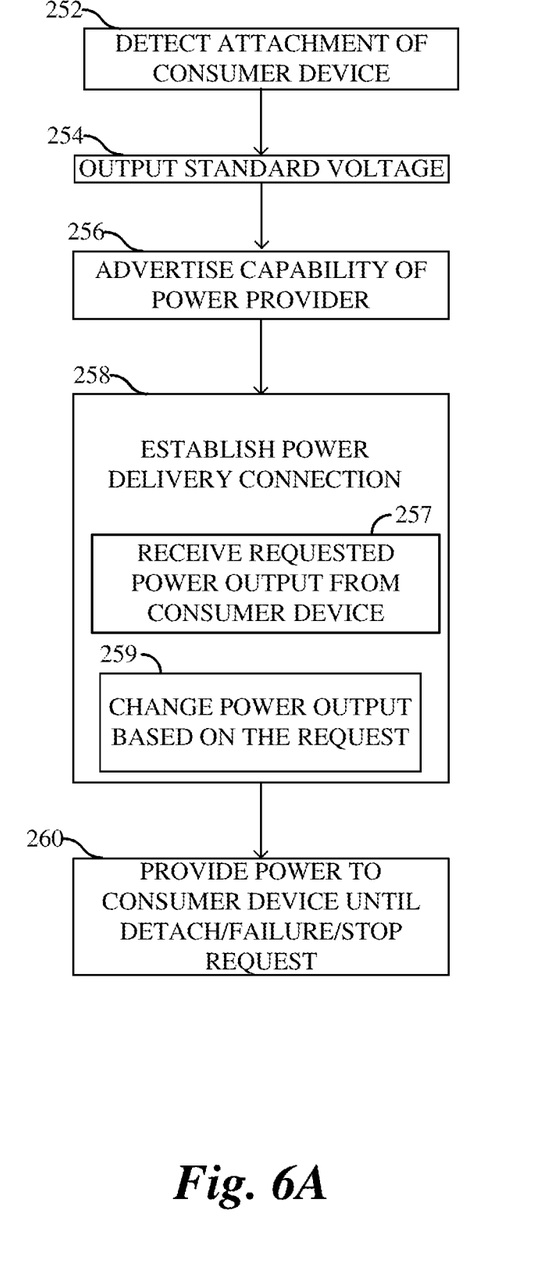
FIGS. 6A-6B, illustrates the operations of the power delivery system in accordance with embodiments of the present invention.
Figure 6B:
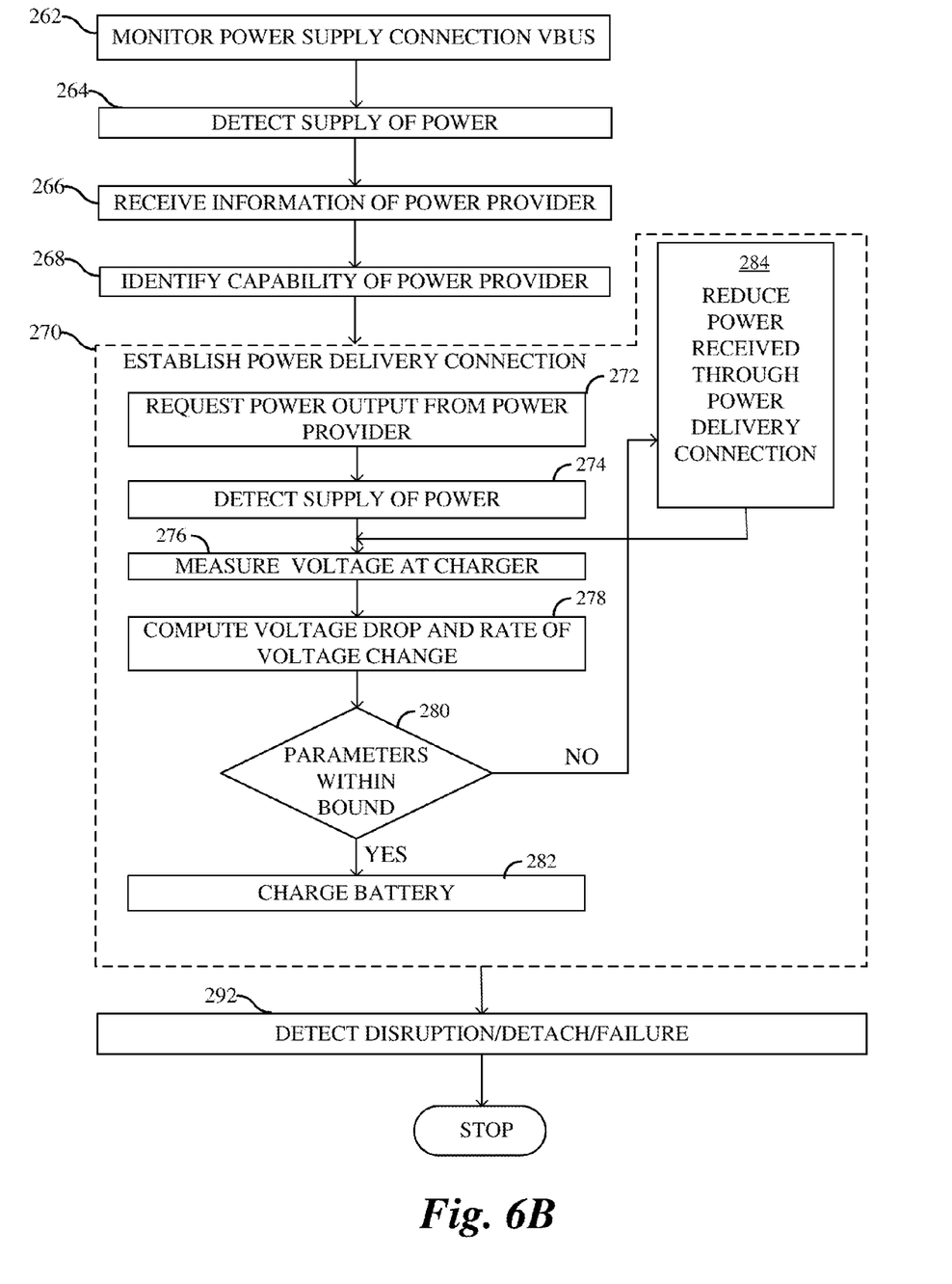

FIG. 6, which includes FIGS. 6A-6B, illustrates the operations of the power delivery system in accordance with embodiments of the present invention. FIGS. 6A and 6B illustrate operations at the power provider device 102 and the power consumer device 110 illustrated in FIG. 5.

Referring to FIG. 6A, the power provider device 102 detects the attachment of the power consumer device 110 after the two devices are physically attached through a power delivery cable 120 and an electrical connection is securely made (box 252).

In one example, the power delivery cable 120 is a USB compliant cable. Accordingly, when the power provider device 102 and the power consumer device 110 are attached to each other, the downstream and upstream ports initially default to standard USB operation (box 254). Therefore, the output on the power supply connection VBUS defaults to 5 V (or 0 V) and the power consumer device 110 draws current in accordance with the USB standards.

Meanwhile, the power consumer device 110 continues to monitors the output at the power supply connection VBUS (box 262 of FIG. 6B). When the power provider device 102 outputs the standard voltage at the power supply connection VBUS, the power consumer device 110 detects an output power (box 264 of FIG. 6B).

Referring to box 256 of FIG. 6A, the power provider device 102 may communicate with the power consumer device 110, for example, through the interface circuit 108. For example, the power provider device 102 may indicate its capability to the power consumer device 110.

Referring to box 266 of FIG. 6B, the power consumer device 110 may receive the communication, which may be an advertisement, from the power provider device 102. Based on this advertisement, the power consumer device 110 may identify the capabilities of the power provider device 102, for example, and then associate the power provider device 102 with a particular charger profile (box 268 of FIG. 6B). For example, the power consumer device 110 may identify that the power provider device 102 is capable of fast charging at multiple voltages/currents. Further, the power consumer device 110 may identify that the output of the power supply connection VBUS may be changed during the charging process.

Next, the power consumer device 110 negotiates the power delivery requirement with the power provider device 102. As next illustrated in box 258 of FIG. 6A and box 270 of FIG. 6B, a power delivery connection is established. For example, the power consumer device 110 requests a particular power output (box 272), which is received at the power provider's interface circuit 108 (box 257). The requested power output may be a constant voltage and/or current. The power provider may change the power output based on the request (box 259).

Referring to FIG. 6B, the power consumer device detects the supply of power at its input (box 274). For example, a voltage sensor at the power consumer device 110 detects the input voltage being provided (box 276). Further, the voltage sensor may monitor the voltage continuously or intermittently at regular intervals. The time variance of the voltage may be used to compute the relative change in voltage with time (box 278).

In one or more embodiments, the rate of voltage change may be compared with a target or threshold rate of voltage change (box 280). If the computed rate of voltage change is less than the threshold rate of voltage change, then the power is supplied to the battery/sink 115, which may be a battery charger so as to charge the battery (box 282). On the other hand, if the computed rate of voltage change is more than the threshold rate of voltage change, then the power supplied to the power sink is reduced or stopped (box 284). This is because a larger change in voltage indicates a faster than target (or expected) heating of the power delivery cable 120. By reducing the power provided to the power sink, the power drawn through the power delivery cable 120 is correspondingly reduced.

Additionally, in various embodiments, the voltage drop due to the cable between the power consumer device 110 and power provider device 102 may be compared with a target voltage drop. For example, a USB cable may have a maximum voltage drop corresponding to a resistance of 50 mΩs. Although the cable may be compliant at the time of purchase or sale to the user, during operation, the resistance may increase due to heating of the cable.

In various embodiments, if the measured voltage drop is less than an acceptable voltage drop, then the power is supplied to the battery/sink 115 at the provided constant current. If the measured voltage drop is higher than an acceptable voltage drop, then the power supplied to the battery/sink 115 is lowered so as to reduce the power passing through the power delivery cable 120.

In various embodiments, the reduction or stopping of the power delivery may be performed internally within the power consumer device 110 by the power supply/charger 112. Reducing the charging current at the power supply/charger 112 will result in a proportional decrease in the flow of current through the power delivery cable.

Additionally, during power delivery, after power delivery has been negotiated, power can be supplied at higher or lower voltages and/or currents than the standard default voltage. Accordingly, in another embodiment, the reduction or stopping of the power delivery may be performed externally by requesting the power provider device 102 to reduce the supplied power, for example, by lowering the charging current. Accordingly, the power consumer device 110 may send a request to the power provider device 102 to lower the power transmitted through the cable.

The power connection may also be further modified during the power delivery connection if the power provider device 102 detects that the power delivery cable 120 and/or power consumer device 110 has a higher capability than was previously advertised. In such a case, the power delivery capability may be re-advertised and a better power delivery connection may be established.

The power provider device 102 may further stop supplying power if it identifies a detachment by the power consumer device 110, a failure, and/or a stop request is received (box 260). Similarly, the power consumer device 110 is configured to detect if there is a disruption in power supply, a detachment, or any other failure (box 292).

The output of the power supply connection VBUS may be modified during the charging process as the power consumer device 110 requests a change in power output, for example, as the battery nears complete charging.

Figure 7:
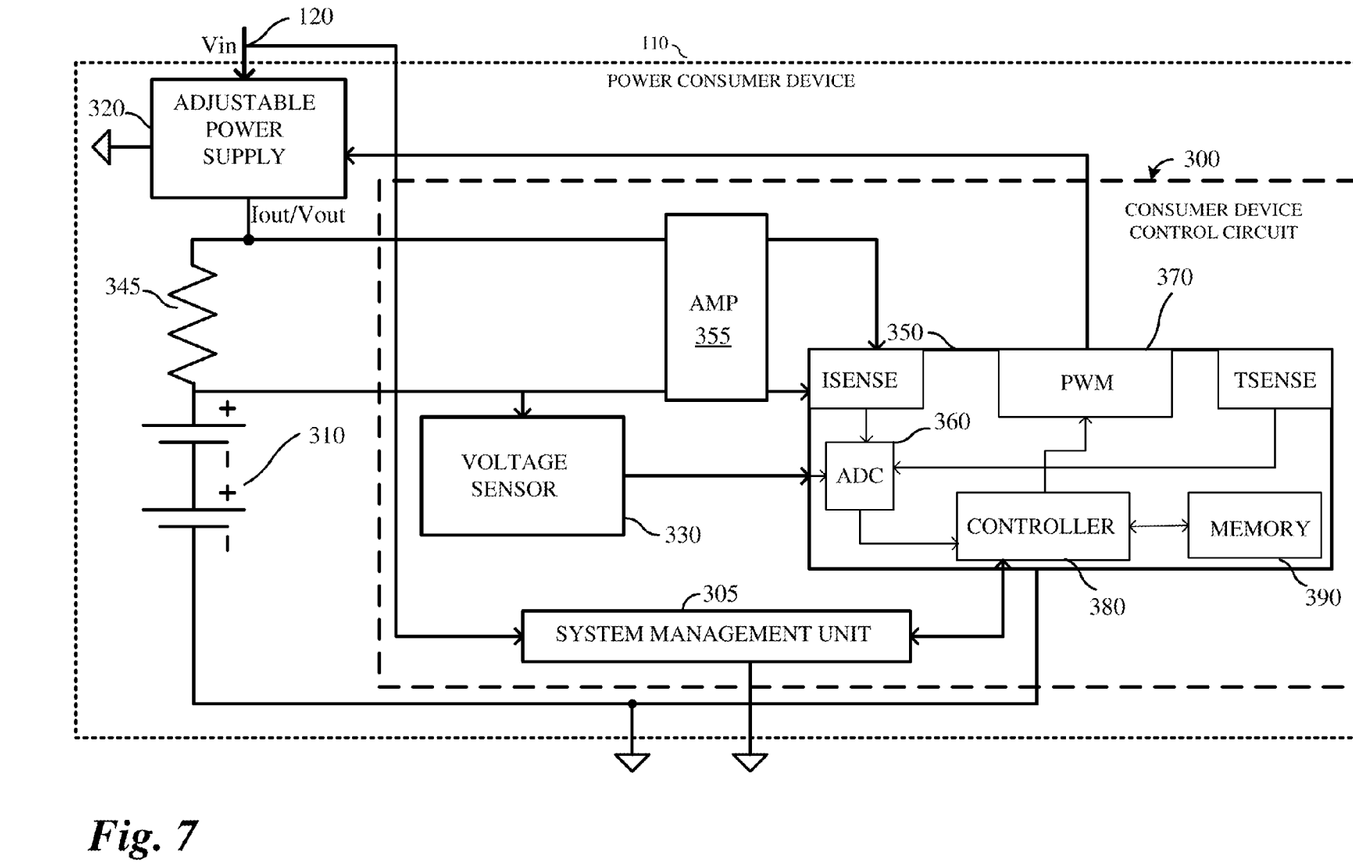
FIG. 7 illustrates a schematic representation of a battery charger in accordance with embodiments of the present invention.

FIG. 7 illustrates a schematic representation of a battery charger in accordance with embodiments of the present invention.

Referring to FIG. 7, the battery charger includes a plurality of batteries 310 to be charged by an adjustable power supply 320. The adjustable power supply 320 may include a DC-DC converter and may comprise different topologies in various embodiments. In one or more embodiments, the adjustable power supply 320 may include an isolated or a non-isolated topology. In one or more embodiments, the adjustable power supply 320 may be a full bridge, half bridge, a forward, a flyback, or a push-pull topology. For example, the adjustable power supply 320 may be a half bridge circuit with two transistors in one embodiment. Alternatively, in another embodiment, the adjustable power supply 320 may be a non-isolated topology such as a buck converter, a buck-boost converter, or a linear regulator.

The power consumer device 110 includes a consumer device control circuit 300 for controlling all of the operations of the power consumer device 110. For example, the consumer device control circuit 300 may monitor the voltage across all of the batteries 310. However, consumer device control circuit 300 may also monitor the voltage across each battery unit of the plurality of batteries 310, and battery units with higher voltage than others may be discharged through shunt transistors.

The consumer device control circuit 300 may include a system management unit 305. For example, the system management unit 305 may monitor and coordinate the various operations of the power consumer device 110 such as with the interface circuit 114, the USB interface 118, the power supply/charger 112 illustrated in FIG. 3.

The system management unit 305 may be coupled to the input line so as to detect and monitor the incoming voltage. The system management unit 305 may include an analog to digital converter and coupled to the VBUS and GND pins of the power consumer device 110 so as to monitor the input voltage received at the power consumer device 110. The system management unit 305 may detect supply of power and set up the power delivery connection with the power provider device 102, and initiate actions to detect disruption, detach or failure of the power delivery connection.

The consumer device control circuit 300 may further include a power controller 350, which may be implemented as a single package or a single chip. The power controller 350 controls the charging current (Tout) and voltage (Vout) provided to the batteries 310.

The system management unit 305 may provide the measured voltage information to the controller 380 of the power controller 350. The system management unit 305 may also request the power provider device 102 to change the supply voltage or current, e.g., through the interface circuit 114 and USB Interface 118.

The power controller 350 may be coupled to voltage sensor 330 to detect the voltage at the input to the batteries 310. Similarly, the current being supplied to the batteries 310 may be measured through the sense resistor 345 and received at current sense pins 340. An optional amplifier 355 circuit may be used to amplify the measured sense signals. The amplifier 355 may be a separate discrete device or may be integrated with the power controller 350.

The power controller 350 may also include other input pins such as a temperature sense pin 410 for receiving signals from a temperature sensor indicating the temperature of the batteries 310. The inputs may be supplied to an analog to digital converter (ADC) 360, which converts the measured analog current and voltage to digital signals and provides it the controller 380.

In various embodiments, the controller 380 is configured to use the input and compute the measured voltage, measured current as well as further process these to obtain a rate of change of voltage. The computed rate of voltage change may be compared with a maximum voltage to determine whether any change in supply current is required. For example, if the rate of change of voltage is higher than a certain threshold, the charging current supplied to the batteries 310 would be lowered. This is because when the voltage drop is too high, then it implies that the connecting cable is heating up or the line regulation of the power provider device 102 has too much loss. Thus, the power controller 350 reduces the current or may even suspend charging the batteries 310 so as to cool the cables. The controller 380 may store some or all of this information in the memory 390.

Accordingly, in various embodiments, the change in rate of voltage may be used to detect heating of the power supply cable.

For example, as an illustration, the controller 380 of the power controller 350 may be designed to stop charging the batteries 310 if the measured voltage exceeds an absolute voltage drop of 50 mΩs and/or 5% of the voltage measured at the power consumer device at no load or no current (i.e., VCharger(0A)). Similarly, the controller 380 of the power controller 350 may be designed to stop charging the batteries 310 if the rate of change in voltage exceeds a target such as 1 mV/sec, for example.

The digital engine of the controller 380 uses the information in the digital signal to control the adjustable power supply 320. For example, this may be accomplished through a pulse width modulation (PWM) controller 370 by applying or varying the duty cycle of a PWM signal to the gate of a switch transistor in the adjustable power supply 320. The adjustable power supply 320 may also include a driver. The signal from the PWM 370 is provided to the adjustable power supply 320 and may include more than one signal. For example, a full bridge converter may need at least two input signals for controlling each pair of the transistors.

In alternative embodiments, the operations described above for calculating the rate of change in voltage and voltage drop may be performed within the system management unit 305. For example, the system management unit 305 may determine whether to regulate the output of the adjustable power supply 320 internally so as to change the power drawn through the power delivery cable 120 or to request the power provider device 102 to reduce or change the power provided through the power delivery cable.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for powering a device, the method comprising:
receiving power at a power consumer device coupled to a power provider device by a cable, the received power being supplied at a first current at an input of the power consumer device;
supplying the received power to a load in the power consumer device;
measuring a rate of change of the voltage at the input of the power consumer device;
determining whether the rate of change of the voltage at the input of the power consumer device is less than a first target rate of change of voltage; and
reducing current received at the input of the power consumer device to a second current lower than the first current if the rate of change of the voltage at the input of the power consumer device is greater than the first target rate of change of voltage.

2. The method of claim 1, further comprising
supplying the received power at a third current to the load if the rate of change of the voltage at the input of the power consumer device is less than the first target rate of change of voltage; and
supplying the received power at a fourth current less than the third power to the load if the rate of change of the voltage at the input of the power consumer device is greater than the first target rate of change of voltage.

3. The method of claim 1, further comprising:
requesting the power provider device to supply power at a current lower than the first current if the rate of change of the voltage at the input of the power consumer device is greater than the first target rate of change of voltage.

4. The method of claim 1, further comprising:
determining whether the rate of change of the voltage at the input of the power consumer device is less than a second target rate of change of voltage, wherein the second target rate of change of voltage is greater than the first target rate of change of voltage;
supplying the received power at a second current to the load if the rate of change of the voltage at the input of the power consumer device is less than the second target rate of change of voltage; and
stop supplying the received power at a third current to the load if the rate of change of the voltage at the input of the power consumer device is greater than the second target rate of change of voltage.

5. The method of claim 1, further comprising:
measuring a voltage drop in the received power at the input of the power consumer device during the supplying of the received power to the load;
determining whether the voltage drop is less than a target voltage drop; and
receiving power at a third current lower than the first current at the input if the voltage drop is greater than the target voltage drop.

6. The method of claim 1, further comprising:
measuring a voltage drop in the received power at the input of the power consumer device;
determining whether the voltage drop is less than a target voltage drop;
supplying the received power at the second current to the load if the voltage drop is less than the target voltage drop; and
stop supplying the received power to the load if the voltage drop is greater than the target voltage drop.

7. The method of claim 1, wherein the device and the cable are compliant with a power delivery standard.

8. The method of claim 1, wherein the load comprises a rechargeable battery.

9. A method for detecting temperature of a power cable, the method comprising:
- measuring a voltage at an output of the power cable during power delivery by the power cable;
- computing a rate of change of voltage at the output of the power cable during the power delivery; and
- computing an indicator of a temperature of the power cable from the rate of change of voltage.

10. The method of claim 9, further comprising:
- reducing the current in the power cable during power delivery if the indicator of the temperature of the power cable exceeds a target temperature.

11. The method of claim 9, wherein the power cable is compliant with a power delivery standard.

12. The method of claim 9, further comprising:
- stopping the power delivery if the indicator of the temperature of the power cable exceeds a target temperature.

13. The method of claim 12, further comprising:
- after a cooling period, restarting power delivery after stopping the power delivery.

14. A power consumer device comprising:
- an input configured to receive power and configured to be coupled to a power provider device by a power delivery cable, the received power having a first current at an input pin of the power consumer device;
- an adjustable power supply configured to supply the received power to a load in the power consumer device; and
- a control circuit configured to
   - compute a rate of change of the voltage of the received power at the input of the power consumer device,
   - determine whether the rate of change of the voltage at the input of the power consumer device is less than a first target rate of change of voltage, and
   - reduce received power at the input of the power consumer device to a second current lower than the first current if the rate of change of the voltage at the input of the power consumer device is greater than the first target rate of change of voltage.

15. The power consumer device of claim 14, wherein the control circuit is further configured to:
- supply the received power at a third current to the load if the rate of change of the voltage at the input of the power consumer device is less than the first target rate of change of voltage, and
- supply the received power at a fourth current less than the third power to the load if the rate of change of the voltage at the input of the power consumer device is greater than the first target rate of change of voltage.

16. The power consumer device of claim 14, wherein the control circuit is further configured to request the power provider device to supply power at a current lower than the first current if the rate of change of the voltage at the input of the power consumer device is greater than the first target rate of change of voltage.

17. The power consumer device of claim 14, wherein the control circuit is further configured to:
- determine whether the rate of change of the voltage at the input of the power consumer device is less than a second target rate of change of voltage, wherein the second target rate of change of voltage is greater than the first target rate of change of voltage,
- supply the received power at a second current to the load if the rate of change of the voltage at the input of the power consumer device is less than the second target rate of change of voltage, and
- stop supplying the received power at a third current to the load if the rate of change of the voltage at the input of the power consumer device is greater than the second target rate of change of voltage.

18. The power consumer device of claim 14, wherein the control circuit is further configured to:
- measure a voltage drop in the received power at the input of the power consumer device during the supplying of the received power to the load,
- determine whether the voltage drop is less than a target voltage drop, and
- receive power at a third current lower than the first current at the input if the voltage drop is greater than the target voltage drop.

19. The power consumer device of claim 14, wherein the control circuit is further configured to:
- measure a voltage drop in the received power at the input of the power consumer device,
- determine whether the voltage drop is less than a target voltage drop,
- supply the received power at the second current to the load if the voltage drop is less than the target voltage drop, and
- stop supplying the received power to the load if the voltage drop is greater than the target voltage drop.

20. The power consumer device of claim 14, wherein the power consumer device is compliant with a power delivery standard.

* * * * *